Dec. 30, 1952        H. VERHEIJ        2,623,478

ROUNDER FOR LONG LOAVES

Filed Jan. 2, 1948        2 SHEETS—SHEET 1

INVENTOR.
Hendrik Verheij

Dec. 30, 1952     H. VERHEIJ     2,623,478
ROUNDER FOR LONG LOAVES

Filed Jan. 2, 1948     2 SHEETS—SHEET 2

INVENTOR.
Hendrik Verheij
BY Dessor Steinberg
Attorney

Patented Dec. 30, 1952

2,623,478

UNITED STATES PATENT OFFICE 2,623,478

ROUNDER FOR LONG LOAVES

Hendrik Verheij, Rotterdam, Netherlands, assignor to N. V. H. Verheij's Machines, Rotterdam, Netherlands, a corporation of the Netherlands Application January 2, 1948, Serial No. 85
In the Netherlands January 8, 1947

2 Claims. (Cl. 107—9)

The object of this invention is to provide a better solution for mechanically rounding pieces of dough after these have left the dough divider. The purpose of this rounding is to stretch the gluten once more and to supply fresh oxygen to the dough piece. These treatments are insufficiently performed by the existing rounders. Moreover it is of great importance for a piece of dough that has already been rounded to be rounded over again after a certain time when it has risen.

A film has then formed round the piece of dough, however, which owing to its slipperiness offers an impediment to once more performing the rounding with the existing machines.

This invention provides a rounder which obviates the drawbacks that have hitherto been experienced when mechanically rounding dough pieces and in which use need not be made of oil or fine flour while the dough piece undergoes a treatment substantially equalling handwork.

For this purpose the rounder according to the invention comprises a rotatable disc having a cylindrical brush disposed at its upper side, which brush is positioned coaxially and which, if desired, is independently rotatable, while, starting from the circumference of the brush, the space above the turntable is divided by a helically wound, vertical or substantially vertical, stationary wall. The inner portion of the helical wall bordering the brush, is provided along the bottom edge with a bearing surface for the dough piece, said surface being directed towards the brush. The configuration of the wall about the brush may be such that the space between the brush and the wall alternately gradually decreases and subsequently suddenly increases.

Furthermore, the wall may be curved inwards along its upper edge, the curve having a shape of an arc which gradually increases in the direction towards the discharge end.

In order to illustrate the invention, an embodiment of the rounder will be now described by way of example with reference to the appended drawings in which.

Figure 1:
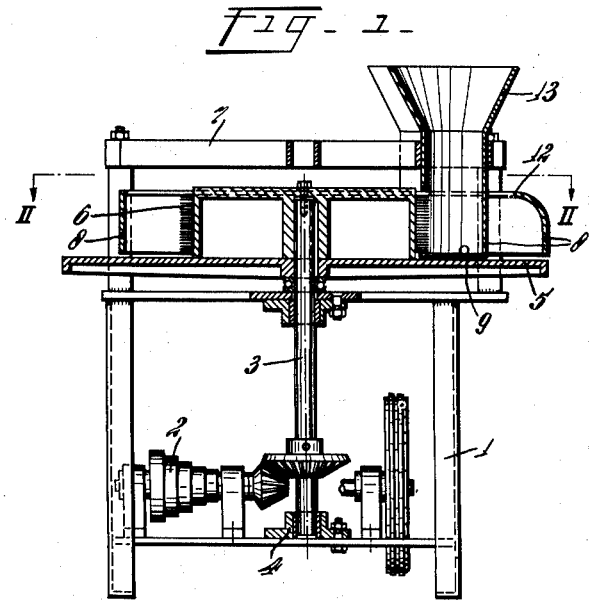
Figure 1 is a vertical section of the machine on the line I—I of Figure 2.
Figure 2:
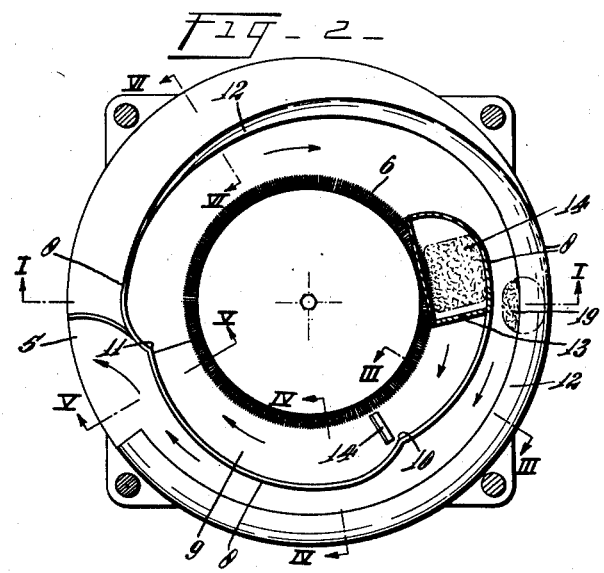
Figure 2 is a plan view partly in section taken on a line in Fig. 1 between the lower side of braces 7 and the top of brush 6.
Figure 3:
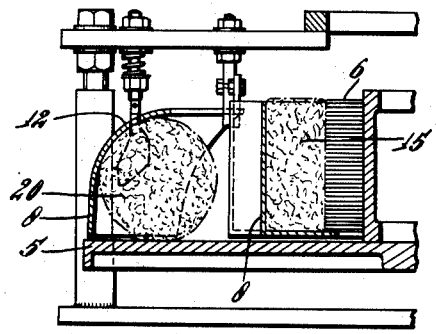
Figure 3 is a section on the line III—III in Figure 2.
Figure 4:
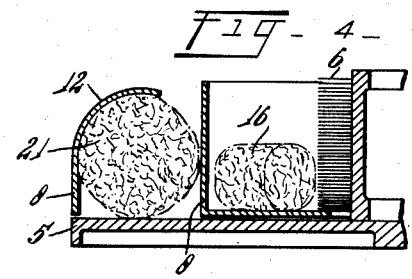
Figure 4 is a section on the line IV—IV in Figure 2.
Figure 5:
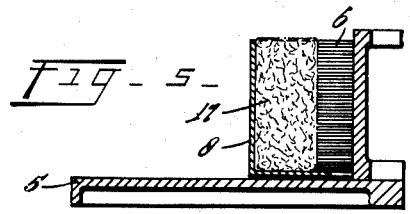
Figure 5 is a section on the line V—V in Figure 2.
Figure 6:
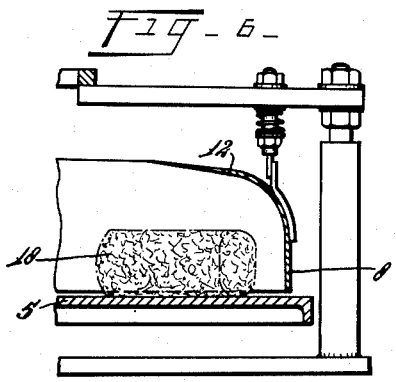
Figure 6 is a section on the line VI—VI in Figure 2.

As shown in the drawing, the machine comprises a table-shaped frame 1 within which the driving gear 2 for a vertical spindle 3 is disposed. Said spindle which at the lower end is rotatably supported in a step-bearing 4, carries a horizontal disc 5 at the upper end and a cylindrical brush 6 superimposed thereon. Though according to the embodiment the disc 5 and the brush 6 are both driven by the spindle 3 and with the same angular velocity, the rounder may also be so constructed in conventional manner, not shown in the drawing, that the disc and the brush are rotated other than in the manner shown.

Above the turntable 5 and suspended from the parts 7 of the frame an approximately vertical and generally helically wound wall 8 is arranged about the brush 6, the inwardly directed end of which wall links up with the circumference of the brush while the outwardly directed end is located over the circumference of the turntable 5.

Starting from the circumference of the brush, the first portion of this wall 8 is—along its lower edge—provided with a horizontal bearing surface 9 for the dough piece to be treated, which dough piece arrives there through the feed hopper 13. At the same time the configuration of this first portion of the wall 8 is such that the space between the circumference of the brush and the wall first remains equal or decreases gradually, to suddenly increase at the point 10, subsequently gradually decreases again and suddenly increases once more at the point 11.

In the direction towards the discharge end of the wall 8 said wall shows along its upper edge a gradually increasing arc-shaped curve 12 directed inwardly.

As soon as the dough piece leaves the divider it falls through the feed hopper 13 between the wall 8 and the brush 6 on to the bearing surface 9 (position 14). The rotating brush 6 engages with the dough piece to roll it up from behind and round a substantially vertical axis, in the same manner as this is effected by handwork, whereby the gluten is strongly stretched. The bearing surface 9 serves to make sure that this rolling up of a dough piece always commences at the same point, while it guarantees that initially the dough piece is solely subjected to the action of the cylindrical brush 6 and not to the action of the turntable. The dough piece rolled up to form a cylinder moves along the wall 8 (position 15) but, after passing the point 10, it will reach the widening and will turn over (position 16).

In the lying position the dough piece is again seized by the brush and rolled up to form a substantially vertical cylinder (position 17) whereby the gluten is again stretched, but now in another direction than the first time. Thereupon, after passing the point 11, the piece of dough turns over once more (position 18) and as a result of the centrifuging action of the turntable 5 it gets out of reach of the cylindrical brush, and by the combined action of the rotating turntable 5 and the stationary wall 8 it is gradually transformed into a ball (positions 19, 20, 21) to be finally discharged from the machine. This transformation of the dough piece into a ball is greatly promoted by the upper edge 12 of the wall 8 being curved gradually farther inwardly in the shape of an arc.

It will be clear that the force acting on the dough piece becomes greater—also under the influence of the increasing velocity—as the dough piece moves farther away from the center of the turntable.

The speed of revolution of the brush and the turntable may be adapted to the kind of dough to be treated, by means of a variable speed driving gear. The capacity of the machine is considerably higher than that of the known machines, while the quality of the treatment equals that of the best handwork. In addition to the rounding of dough pieces for long loaves the machine also excellently lends itself to the rounding of dough pieces from which rusks are to be baked.

I claim:

1. A machine for rounding up pieces of dough for long loaves, comprising a turntable, a stationary approximately vertical wall positioned above said turntable, said wall, being generally helically wound with respect to the axis of said turntable, a cylindrical brush rotatably arranged over and in co-axial relationship with said turntable, said brush being in co-operative relationship with said helical wall, said wall being provided with a surface for supporting a piece of dough, said surface being located along the lower edge of said wall and extending towards said brush.

2. A machine for rounding up pieces of dough for long loaves comprising a turntable, a stationary approximately vertical wall at a higher level than said turntable, a rotatable cylindrical brush within said wall over said turntable and in register therewith, said wall comprising two portions, at least, converging towards said brush in the direction of rotatability of said turntable, and adapted to co-operate with said brush for action on pieces of dough fed to the machine, the end of one wall portion being nearest to the axis of said turntable being connected to the end of the following wall portion being remote from said axis, and said wall having along its foot an approximately horizontal surface extending toward said brush for supporting pieces of dough.

HENDRIK VERHEIJ.

REFERENCES CITED

The following references are of record in the file of this patent:

UNITED STATES PATENTS

| Number | Name | Date |
|---|---|---|
| 1,192,973 | Allison | Aug. 1, 1916 |
| 1,253,443 | Van Houten | Jan. 15, 1918 |
| 1,535,544 | Reese | Apr. 28, 1925 |
| 2,245,284 | Lockwood | June 10, 1941 |

FOREIGN PATENTS

| Number | Country | Date |
|---|---|---|
| 56,372 | Austria | Nov. 25, 1912 |